United States Patent [19]

Taguchi et al.

[11] Patent Number: 4,678,870
[45] Date of Patent: Jul. 7, 1987

[54] POSITION DETECTING DEVICE

[75] Inventors: Yoshinori Taguchi; Tsuguya Yamanami, both of Kuki, Japan

[73] Assignee: Wacom Co., Ltd., Saitama, Japan

[21] Appl. No.: 807,715

[22] Filed: Dec. 11, 1985

[30] Foreign Application Priority Data

Dec. 13, 1984 [JP] Japan .................................. 59-263496
Dec. 27, 1984 [JP] Japan .................................. 59-274020

[51] Int. Cl.⁴ ............................................ G08C 21/00
[52] U.S. Cl. ..................................................... 178/19
[58] Field of Search ..................................... 178/18, 19

[56] References Cited

U.S. PATENT DOCUMENTS 4,205,199 5/1980 Mochizuki ............................ 178/19

Primary Examiner—Stafford D. Schreyer
Attorney, Agent, or Firm—Pollock, VandeSande & Priddy

[57] ABSTRACT

A position detecting device includes a magnetic member composite which is integrally composed of a pair of insulating substrates with a plurality of long magnetic members sandwiched therebetween and arranged substantially parallel to each other and two conductive member composites, each of which is composed of a plurality of conductive members arranged substantially parallel to each other.

9 Claims, 14 Drawing Figures

POSITION DETECTING DEVICE

BACKGROUND OF THE INVENTION

1. Field of the Invention

The present invention relates to a device for detecting a position designated by a position designating magnetic generator on the basis of change in magnetic permeability of a magnetic substance to which a magnetic field is applied by the position designating magnetic generator.

2. Description of the Prior Art

A conventional position detecting device detects a position which is indicated by a position indicating pen in the following way. A pulse current is applied to one end of a magnetostrictive transmittance medium or to the tip of a position indicating pen in order to produce magnetostrictive oscillating waves on the magnetostrictive transmittance medium, and the time required for the voltage induced by the magnetostrictive oscillating waves to be detected on a detection coil which is provided on the tip of the position indicating pen or one end of magnetostrictive transmittance medium is measured by a processing unit or the like, so that the position of the position indicating pen may be obtained by calculation. Such a device is comparatively good in detecting accuracy but the fact that a cord is required between the pen and the device for delivery of a timing signal and the like between the pen and the processing unit and the like brings about various problems. For example, the operability of the pen is greatly limited; the device is likely to be influenced by induction from other mechanisms, thereby causing errors; the pen may be a source of noise generation; and the pen must be held perpendicular to the magnetostrictive transmittance medium and brought into close proximity thereto during operation.

In another conventional position detecting device, a plurality of driving lines and detecting lines is arranged orthogonal to each other, a current is applied to the driving lines subsequently, and the induced voltage is detected by subsequently selecting the detecting lines, so that the position designated by a position indicating pen having a magnetic member such as ferrite is detected from the position of a detecting line on which a large voltage has been induced. This device dispenses with the need for the position indicating pen to be provided with a cord. However, the resolving power of the ordinate position is determined by the spacing between the lines, and if the spacing is reduced as a means of enhancing the resolving power, the SN ratio and stability are degenerated or, in other words, it is difficult to improve the resolving power. Further, it is difficult to detect a position directly over the intersecting points of the driving lines and the detecting lines. Since the position indicating pen must be used in close proximity to the lines, nothing thick is allowed to be placed on the input surface during use.

In addition, both the above-described position detecting devices, which use a coil, have limitations with respect to the potential for reducing the thickness of the tablet portion.

SUMMARY OF THE INVENTION

Accordingly, it is a primary object of the present invention to provide a position detecting device including a magnetic member composite which is integrally composed of a pair of insulating substrates with a plurality of long magnetic members arranged therebetween substantially parallel to each other, and a plurality of conductive member composites composed of a plurality of conductive members arranged substantially parallel to each other. A tablet portion is formed of the conductive composites each of which is placed on both sides of the magnetic composite in such a manner that the conductive members and the magnetic members are orthogonal to each other, and the conductive members on each of the conductive member composites are connected vertically with the adjacent ones, thereby alternately constituting exciting lines and detecting lines. This arrangement makes it possible to make the tablet portion of this device thinner than those used in the conventional devices. This device is easy to manufacture and enables mass production and, hence, reduction in cost. Furthermore, since magnetic flux between the exciting lines and the detecting lines changes solely within the magnetic materials, their close connection provides a large detection voltage and a good SN ratio. In addition, this device is not likely to be influenced by external induction nor to produce induction noise which would be transmitted outside. Since a position is able to be designated by application of a slight magnetic bias to the magnetic materials, it is not necessary to bring the position designating magnetic generator into proximity with the magnetic members, and a high effective read value is obtained. It is also possible to insert the tablet portion between metal sheets other than ferromagnetic materials. In addition, since delivery of a timing detection signal or the like is unnecessary, the position designating magnetic generator can be designed to be a cordless member, thereby improving the operability thereof.

A second object of the present invention is to provide a position detecting device which includes two magnetic member composites each of which is integrally composed of a pair of insulating substrates with a plurality of long magnetic members arranged therebetween substantially parallel to each other, and four conductive member composites, each of which is composed of a plurality of conductive members arranged substantially parallel to each other. A tablet portion is composed of the magnetic member composites and the conductive member composites. The two magnetic member composites are overlaid one over the other in such a manner that the magnetic materials thereof are disposed in the directions of the X axis and the Y axis, (X axis and Y axis are indicated by the arrows shown in FIG. 2), respectively, and two of the conductive member composites are placed on both sides of the overlaid magnetic material composites in such a manner that the conductive materials on one composite are disposed in the direction of the X axis and those on the other composite are arranged in the direction of the Y axis. The conductive members on the conductive member composites arranged in the directions of the X and Y axes are respectively connected vertically with the adjacent ones, thereby alternately constituting exciting lines and detecting lines in the directions of the X and Y axes. This device not only has the various advantages mentioned in the preceding paragraph, but also is capable of conducting two-dimensional position detection.

It is a third object of the present invention to provide a position detecting device including a tablet portion composed of a magnetic member composite composed of two insulating substrates and two sets of a plurality of long magnetic members arranged substantially parallel to each other. The two sets consisting of the plurality of long magnetic members are sandwiched between the substrates in such a manner that one set is disposed orthogonally with respect to the other. This device has the advantage of allowing the thickness of the tablet portion to be reduced as well as the advantages described in the previous paragraph.

The above and other objects, features and advantages of the present invention will become clear from the following description of the preferred embodiment thereof, taken in conjunction with the accompanying drawings.

BRIEF DESCRIPTION OF THE DRAWINGS

The accompanying drawings show in combination one embodiment of the present invention, in which.

DESCRIPTION OF THE PREFERRED EMBODIMENT

Figure 1:
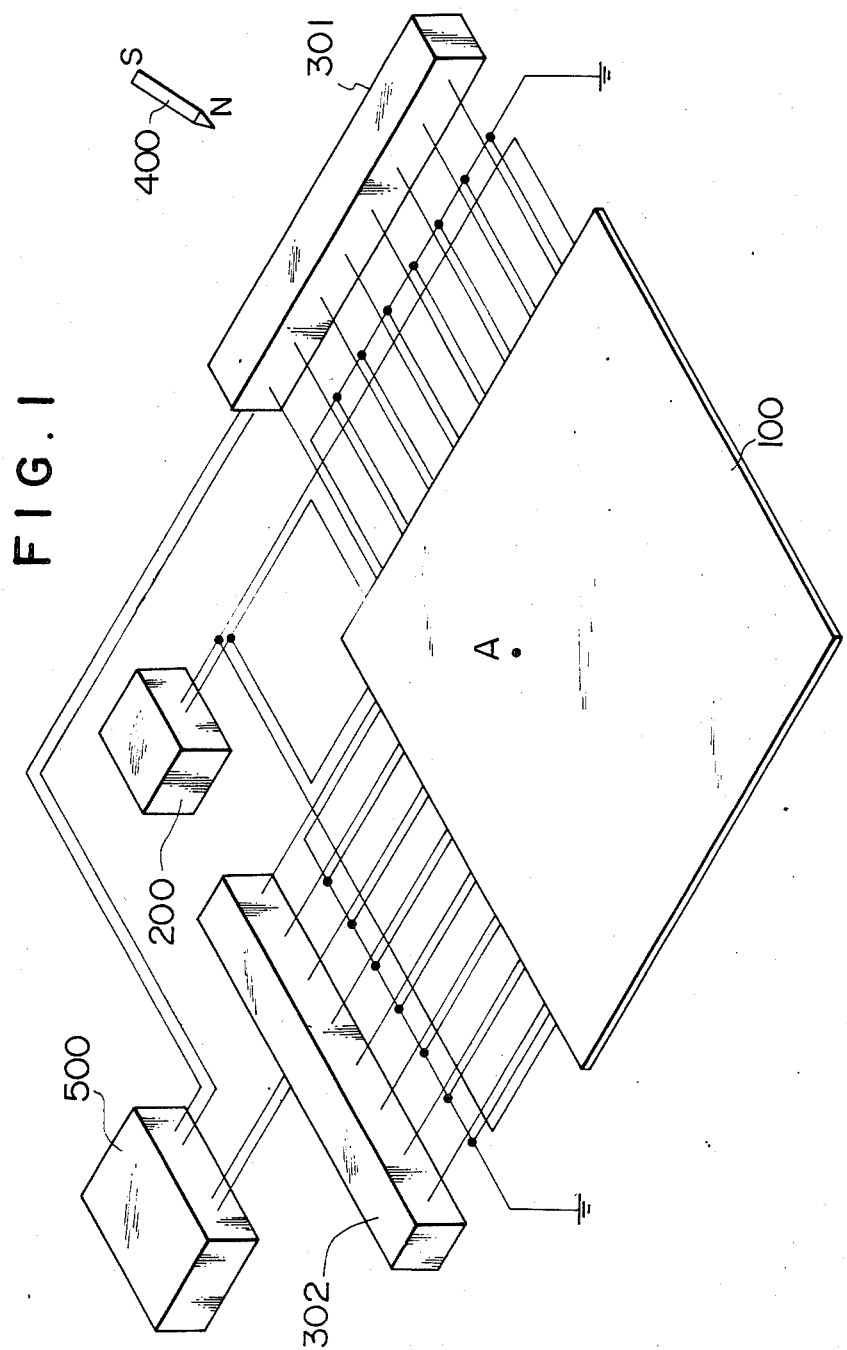
FIG. 1 is a perspective view of the embodiment of the present invention.

Referring first to FIG. 1, which is a partially-cutaway exploded perspective view of an embodiment of the present invention, the reference numeral 100 denotes a tablet portion, 200 a driving current source, 301 and 302 multiplexers, 400 a position designating magnetic generator such as a bar magnet, and 500 a position detecting circuit.

Figure 2:
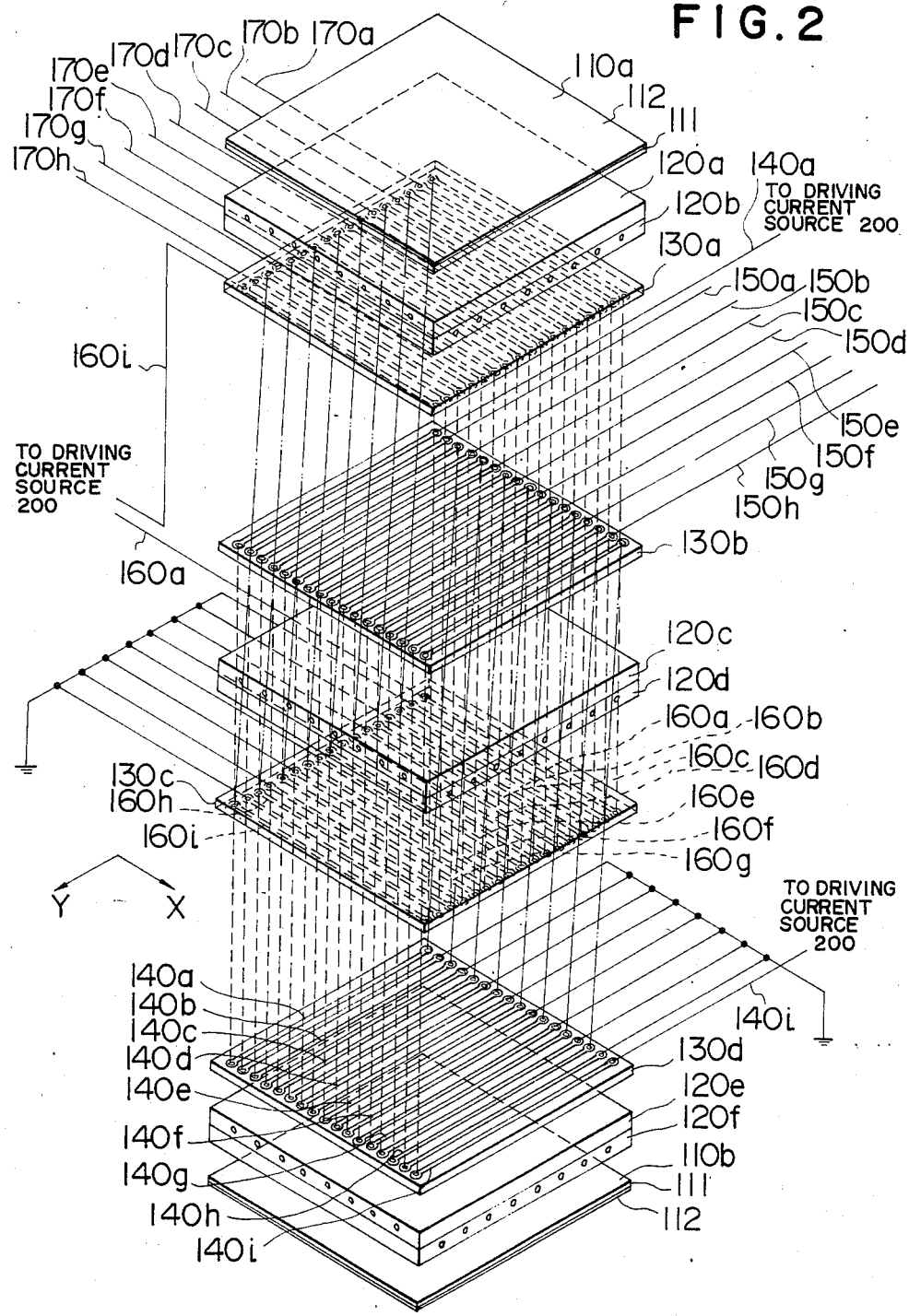
FIG. 2 shows a practical arrangement of a tablet portion.

The tablet portion 100 is, as shown in FIG. 2, composed of twelve layers which consist of a shield sheet 110a, magnetic member composites 120a, 120b, conductive member composites 130a, 130b, magnetic member composites 120c, 120d, conductive member composites 130c, 130d, magnetic member composites 120e, 120f and a shield sheet 110b, the twelve layers being laid sequentially on each other in reverse order with the shield sheet 110a on the top.

A printed circuit base board is used as the shield sheets 110a, 110b each of which is an insulating sheet 111 of, e.g., a glass epoxy resin with a copper sheet 112 pasted on one side thereof.

Figure 3:
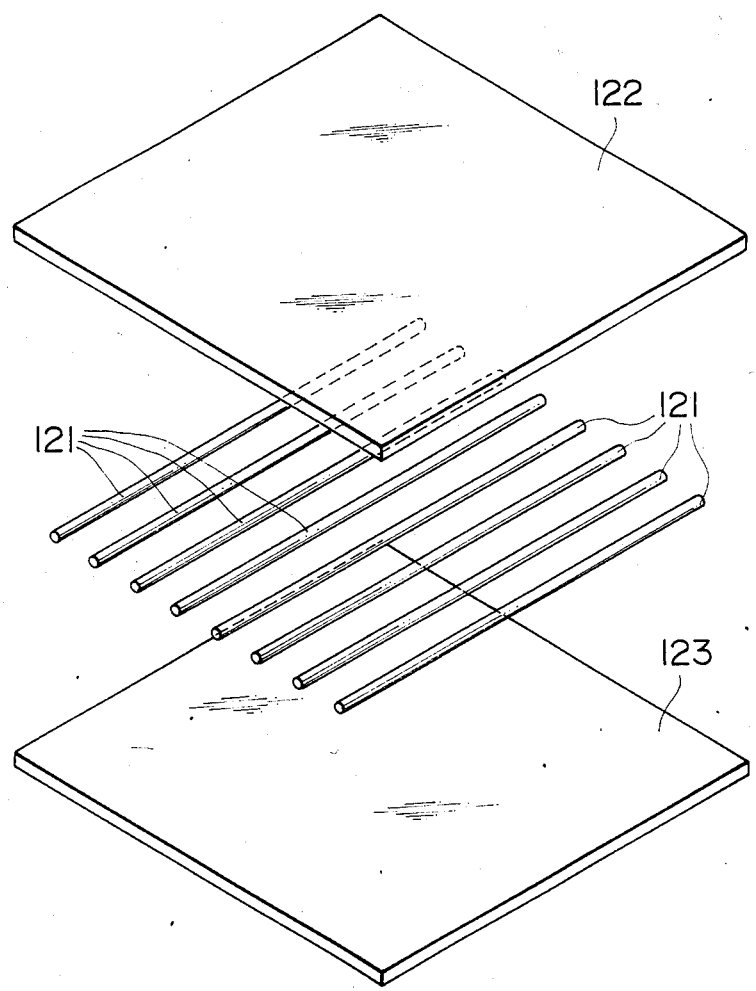
FIG. 3 shows the arrangement of a magnetic material composite.
Figure 4:
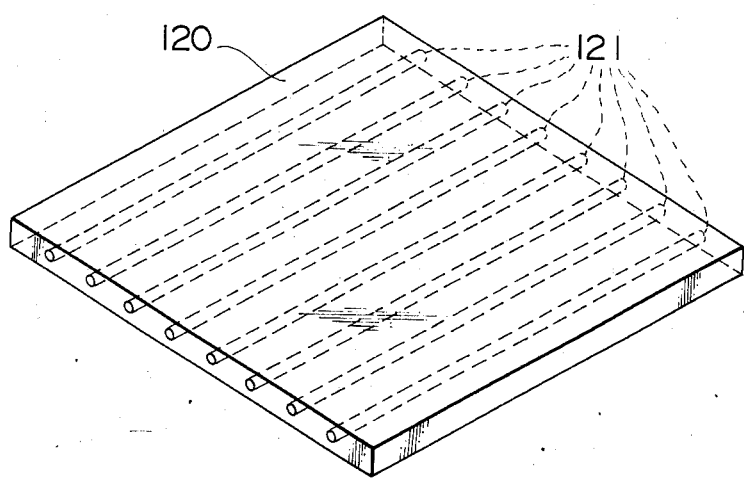
FIG. 4 is a perspective view of a magnetic material composite.

Each of the magnetic member composites 120a to 120f is, as shown in FIG. 3, formed of a plurality of (eight, in FIG. 3) long magnetic members 121 which are arranged substantially parallel to each other, sandwiched between insulating substrates 122, 123 of, e.g., a glass epoxy resin, and bonded into one body by heat contact bonding or the like, as is shown in FIG. 4. The magnetic member 121 is preferably made of a material which is magnetized only slightly by any magnet brought close to it, that is, a material which has small retentivity and high magnetic permeability ($\mu$) e.g., an amorphous alloy wire having a circular cross section of 0.1 mm in diameter. As an amorphous alloy, for example, $(Fe_{1-x}Co_x)_{75}Si_{10}B_{15}$ (atomic %) is suitable, wherein x represents the rate of Fe and Co, ranging from 0 to 1.

Figure 5:
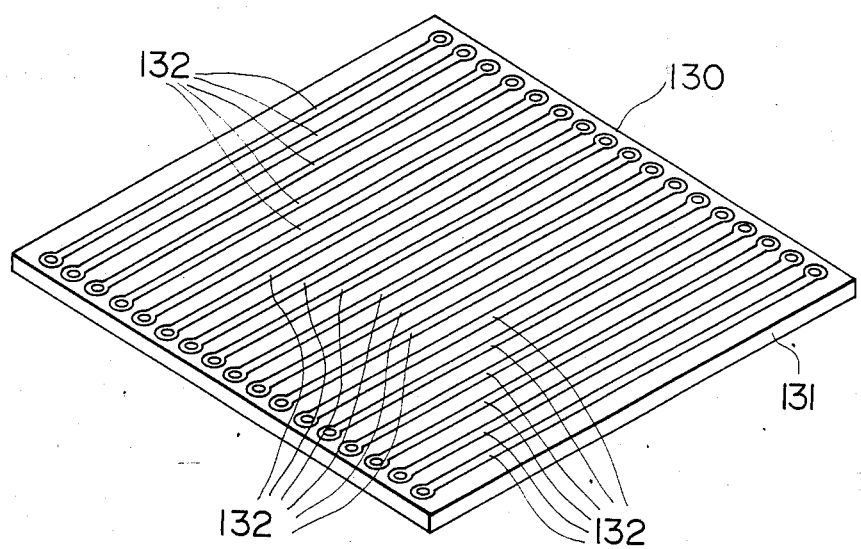
FIG. 5 is a perspective view of a conductive material composite.

Each of the conductive member composites 130a to 130d is composed of an insulating printed circuit base board 131 of, e.g., a glass epoxy resin with a copper sheet pasted on one side thereof. The printed circuit base board 131 is etched such as to form a plurality of (seventeen, in FIG. 5) conductive members 132 having a land hole at both ends thereof.

The magnetic member composites 120a and 120b, 120c and 120d, and 120e and 120f are bonded together by heat contact bonding and other substrates are bonded with and fixed to each other through adhesive sheets. Each of the magnetic members of the magnetic member composites 120a, 120c and 120e is disposed in the direction of the X axis, while each of the conductive members of the conductive member composites 130a, 130c is disposed orthogonally with respect to the Y axis, and each of the conductive members of the conductive member composites 130b, 130d is disposed orthogonally with respect to the X axis.

Alternatively, the tablet portion may be manufactured by heat contact bonding two magnetic member composites such that the magnetic members of one of the composites are orthogonal to those of the other component; adhering and fixing the printed circuit base board to both outer surfaces of the magnetic member composites; and thereafter with or without forming conductive members by an etching process or the like, forming a group consisting of the shield sheet 110a, the magnetic member composites 120a, 120b and the conductive member composite 130a, a group consisting of the conductive member composite 130b, the magnetic member composites 120c, 120d, and the conductive member composite 130c, and a group consisting of the conductive member composite 130d, the magnetic member composites 120e, 120f and the shield sheet 110b; and further adhering and fixing these groups to each other. The total thickness of the tablet portion is actually about 3 to 5 mm, in FIGS. 2 to 5 the tablet portion being enlarged solely in the direction of the thickness.

Each conductive member of the conductive member composites 130b and 130d is connected such that each opposing pair is connected at the land holes at one end thereof by through-hole contact, thereby alternately constituting exciting lines 140a to 140i and detecting lines 150a to 150h in the direction of the X axis, which are wound around the magnetic members 121 in the magnetic member composite 120d. The other ends of the exciting lines 140a to 140i on the conductive member composite 130b are connected to the other ends of the adjacent exciting lines 140a to 140i of the conductive member composite 130d, namely, connected in series, and the other ends of the exciting lines 140a and 140i are connected to the driving current source 200. The other end of each of the detecting lines 150a to 150h on the conductive member composite 130b is connected to the multiplexer 301, and the other ends of the detecting lines 150a to 150h on the conductive member composite 130d are grounded in common with each other.

Each conductive member of the conductive member composites 130a and 130c is connected such that each opposing pair is connected at the land holes at one end thereof by feed through hole contact, thereby alternately constituting exciting lines 160a to 160i and detecting lines 170a to 170h in the direction of the Y axis, which are wound around the magnetic members 121 in the magnetic member composite 120c. The other ends of the exciting lines 160a to 160i on the conductive member composite 130a are connected to the other ends of the adjacent exciting lines 160a to 160i of the conductive member composite 130c namely, connected in series, and the other ends of the exciting lines 160a and 160i are connected to the driving current source 200. The other end of each of the detecting lines 170a to 170h on the conductive member composite 130a is connected to the multiplexer 302, and the other ends of the detecting lines 170a to 170h on the conductive member composite 130c are grounded in common with each other.

The driving current source 200 constantly supplies an alternating current (e.g., a sine-wave alternating current) of a predetermined frequency to the exciting lines 140a to 14i and 160a to 160i The multiplexers 301, 302 selectively supply the output signals from the detecting lines 150a to 150h and the 170a to 170h to the position detecting circuit 500 in accordance with a control signal.

Figure 6:
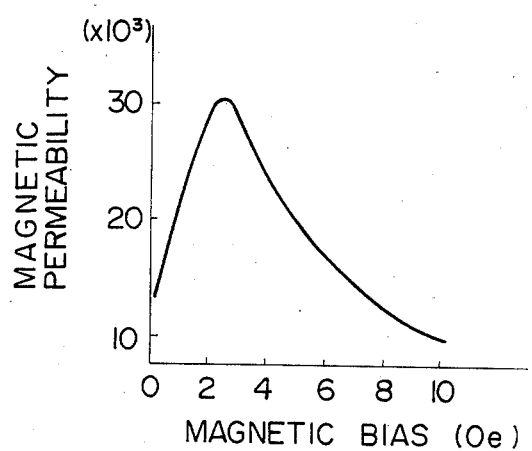
FIG. 6 is a characteristic curve of magnetic bias in relation to magnetic permeability.

In this structure, an induced voltage is produced on the detecting lines 150a to 150h and 170a to 170h by electromagnetic induction of the alternating current which flows on the exciting lines 140a to 140i and 160a to 160i Since this electromagnetic induction is conducted through the magnetic members 121 of the magnetic member components 120a to 120f, the greater the magnetic permeability of the magnetic members 121 is, the greater is the value of the induced voltage. The magnetic permeability of the magnetic members 121 greatly varies in accordance with the magnitude of the magnetic bias externally applied thereto. The degree by which the magnetic permeability changes differs depending upon the composition of the magnetic member employed, the frequency of the above-described alternating current, and whether or not a heat treatment or the like is applied to the magnetic member. It is therefore possible to set the magnetic permeability so that it reaches its maximum when a predetermined amount of magnetic bias is applied to the magnetic members, as shown in FIG. 6. Accordingly, the application of the predetermined amount of magnetic bias to the magnetic members 121, in this case, increases the voltages induced on the detecting lines 150a to 150h and 170a to 170h from the exciting lines 140a to 140i and 160a to 160i It is here assumed that the position designating bar magnet 400 in FIG. 1 is situated above a position A on the tablet portion 100 which is a distance $X_s$ away from the detecting line 150a in the direction X and which is a distance $Y_s$ away from the detecting line 170a in the direction Y, with the North pole directed downward and that the predetermined amount of magnetic bias is applied to the magnetic members 121.

Figure 7:
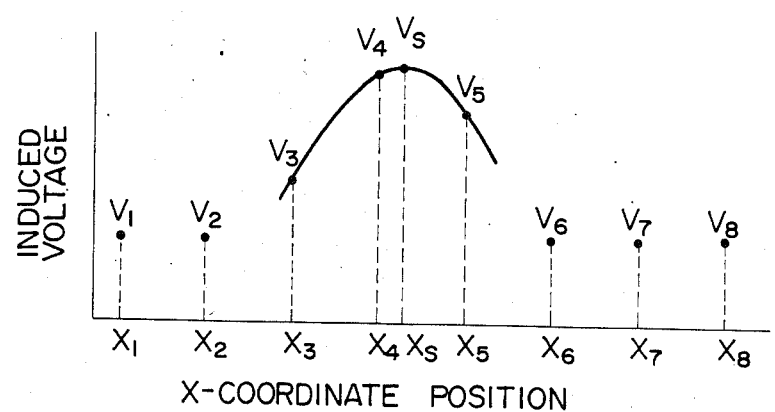
FIG. 7 is a graph showing an example of induced voltage produced on each detecting line in the direction of the X axis.

At this time, induced voltages $V_1$ to $V_8$ shown in FIG. 7 are produced on the detecting lines 150a to 150h in the direction X. In the graph shown in FIG. 7, the abscissa represents the coordinate positions $X_1$ to $X_8$ in the direction X which correspond to the respective positions of the detecting lines 150a to 150h, while the ordinate represents the value of the induced voltages. The largest (maximum) value among the voltages $V_1$ to $V_8$ is obtained when the detecting line is immediately under the position A. Each of the voltages $V_1$ to $V_8$ is obtained by the multiplexer 301. Accordingly, if the value of the X-coordinate corresponding to the maximum value of the induced voltage is calculated by the position detecting circuit 500, the X-coordinate value $X_s$ of the bar magnet 400 is obtained.

There may be various methods of calculating the coordinate value $X_s$. One of them is a method wherein the wave form in the vicinity of the maximum value shown in FIG. 7 is approximated by an appropriate function, and the coordinate corresponding to the maximum value of the function is obtained. For example, when the induced voltages from the coordinate $X_3$ to the coordinate $X_5$ are approximated by a quadratic function (shown by the solid line in FIG. 7), the following formulae are formed from the induced voltage on the detecting lines and the coordinate values thereof, where the spacing between each pair of adjacent detecting lines 150a to 150h is assumed to be $\Delta X$.

$$V_3 = a(X_3 - X_s)^2 + b \qquad (1)$$

$$V_4 = a(X_4 - X_s)^2 + b \qquad (2)$$

$$V_5 = a(X_5 - X_s)^2 + b \qquad (2)$$

wherein
a and b are constants (a>0).
Further, the following formulae hold:

$$X_4 - X_3 = \Delta X \qquad (4)$$

$$X_5 - X_3 = 2\Delta X \qquad (5)$$

The formulae (4) and (5) are substituted into the formulae (2) and (3), respectively, and the formulae (2) and (3) are rearranged to obtain the following formula:

$$X_s = X_3 + \Delta X/2 \ \{(3V_3 - 4V_4 + V_5)/(V_3 - 2V_4 + V_5)\} \qquad (6$$

Accordingly, it is possible to obtain the X-coordinate value by delivering the induced voltages $V_3$, $V_4$, and $V_5$ on the detecting lines 150c, 150d, and 150e, respectively, and the coordinate value $X_3$ (known) of the detecting line 150c to the position designating circuit 500, and calculating the formulae(6). The same X-coordinate value is also obtained when the bar magnet 400 is moved along the Y axis.

Induced voltages similar to those shown in FIG. 7 are obtained on the detecting lines in the direction Y, and the Y-coordinate value $Y_s$ is obtained by a similar calculation.

Figure 8:
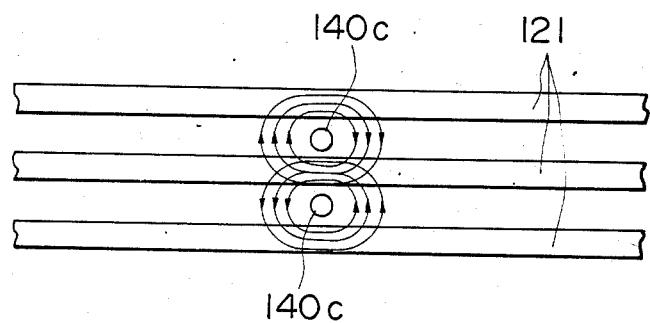
FIG. 8 is an explanatory view of the magnetic flux around the exciting lines.

Since the main purpose of providing the magnetic member composites 120a, 120b, 120e, and 120f is to form a passage for the magnetic flux which is produced around the exciting lines, as shown in FIG. 8, for the purpose of obtaining a larger electromagnetic induction therethrough, they can be eliminated.

The shield sheets 110a, 110b, which are provided for preventing transmittance of external noise to the interior and of induced noise to the exterior can also be dispensed with. It is possible to construct a position detecting device for only one direction (in the direction X, in this case) by eliminating the magnetic member composites 120a, 120c and 120e and the conductive member composites 130a, and 130c.

Figure 9:
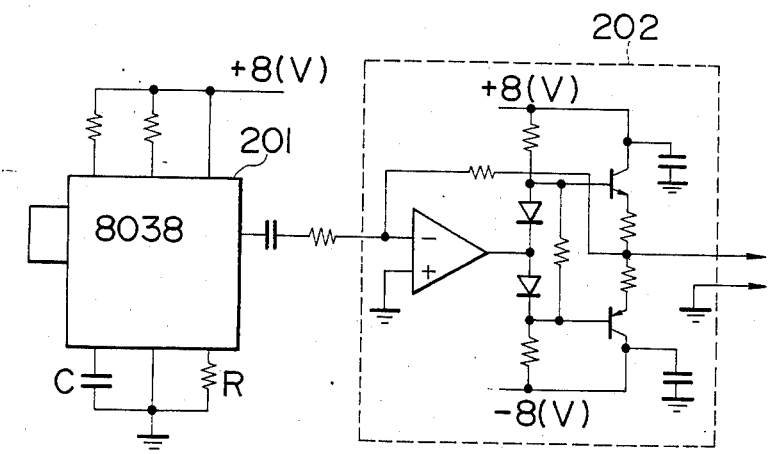
FIG. 9 is an electric circuit diagram showing an example of a driving current source.

Referring next to FIG. 9 which is a circuit diagram showing a practical arrangement of the driving current source 200, the reference numeral 201 denotes a function generator, e.g., IC. 8038 manufactured by Intersil, which outputs a sine-wave signal of a predetermined frequency determined by the value of a capacitor C and that of a resistor R. A power driver 202 is composed of an operational amplifier and a current amplifier, and is arranged such as to current-amplify the sine-wave signal and deliver the thus amplified signal to the exciting lines 140a to 140i and 160a to 160i.

Figure 10:
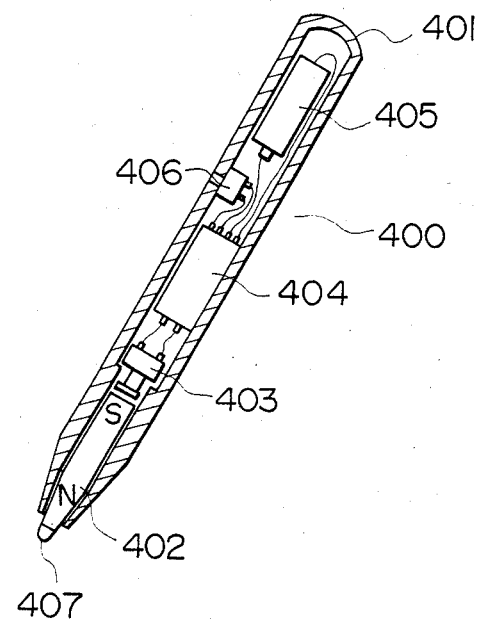
FIG. 10 is a sectional view of an example of a position designating magnetic generator.
Figure 11:
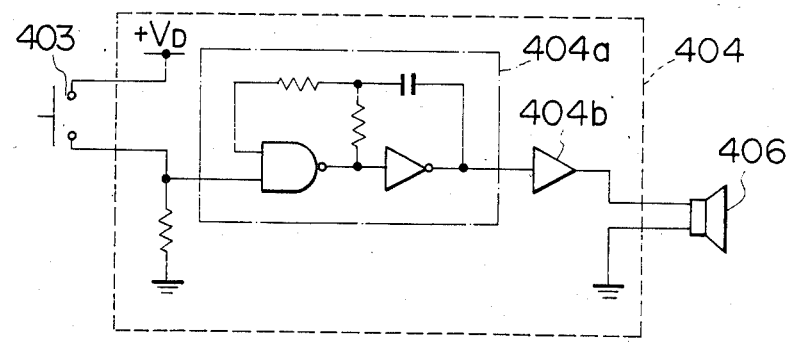
FIG. 11 is an electric circuit diagram thereof.

FIG. 10 is a sectional view of an example of the position designating magnetic generator 400, while FIG. 11 is an electric circuit diagram thereof. In FIG. 10, the reference numeral 401 denotes a pen-shaped container made of a synthetic resin or the like. A bar magnet 402 with a tapered tip is housed at one end of the container 401 so as to be slidable axially with respect to the container 401. A control switch 403 is mounted inside the container 401 so as to face the inner end of the bar magnet 402. A transmitter 404 for transmitting an ultrasonic signal and a battery 405, together with an ultrasonic transmitter 406, are housed at appropriate positions inside the container 401. When an operator holds the container 401 and presses the tip of the bar magnet bar 402 covered with a rubber cover 407 against the input surface, the bar magnet 402 slides so as to turn ON the switch 403, thus activating an oscillation circuit 404a and an amplifier 404b in the transmitter 404, so that a signal which indicates the start of measurement, e.g., a continuous pulse signal of a predetermined frequency, is converted into an ultrasonic signal and transmitted from the ultrasonic transmitter 406.

Figure 12:
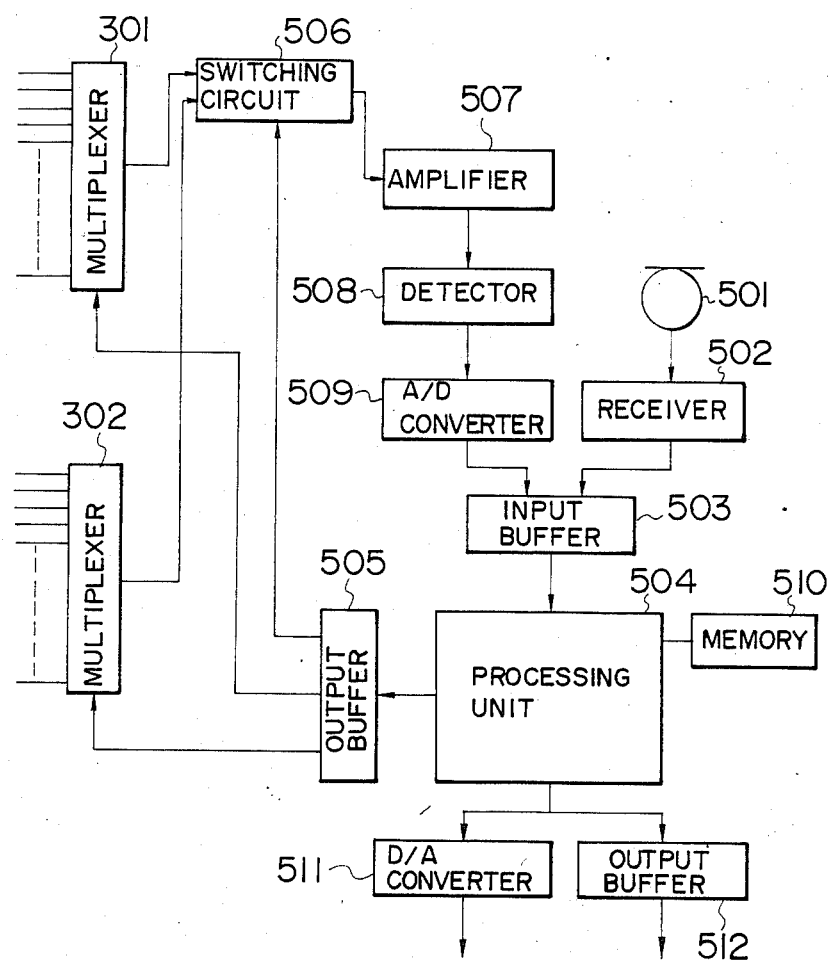
FIG. 12 is a block diagram showing a practical arrangement of a position detecting circuit.

FIG. 12 is a circuit diagram which shows the structure of the position detecting circuit 500. When the above-described ultrasonic signal which indicates the start of measurement is transmitted from the ultrasonic transmitter 406, the ultrasonic signal is received by an ultrasonic receiver 501, amplified and shaped by a receiver 502, and then converted again to the original signal, e.g., the continuous pulse signal of the predetermined frequency, before being delivered to an input buffer 503. When a processing unit 504 recognizes the start of measurement by reading out the measurement start signal from the input buffer 503, the unit 504 delivers a control signal to both a switching circuit 506 and the multiplexer 301 through an output buffer 505 so that the respective induced voltages on the detecting lines 150a to 150h in the direction X are successively input to an amplifier 507. Each of the induced voltages is amplified by the amplifier 507 and rectified by a detector 508 so as to be converted into a DC voltage which is further converted into a digital value by an analog/digital (A/D) converter 509 and is then delivered to the processing unit 504 through the input buffer 503. In the processing unit 504, the induced voltages (digital values) are temporarily stored in a memory 510, and the induced voltage $V_K$ having the maximum value ($K=1$, 2, ... 8) is detected from these stored induced voltages. The processing unit 504 further takes out the induced voltage $V_{K-1}$ which immediately precedes the induced voltage $V_K$ and the induced voltage $V_{K+1}$ which is immediately subsequent to the voltage $V_K$. Thus, the above formula (6) is arithmetically processed by employing the voltages $V_{K-1}$, $V_K$, and $V_{K+1}$ as the voltages $V_3$, $V_4$, and $V_5$, respectively, thereby obtaining the X-coordinate value.

Next, the processing unit 504 delivers a control signal to both the switching circuit 506 and the multiplexer 302 through the output buffer 505 so that the respective induced voltages on the detecting lines 170a to 170h in the direction Y are successively input to the processing unit 504 in order to obtain the Y-coordinate value by a processing operation similar to that described above. The processing unit 504 delivers the thus obtained X-coordinate and Y-coordinate values to a digital indicator (not shown) through an output buffer 512 in order to indicate them to a computer (not shown) in order to process them, or to a digital/analog (D/A) converter 511 in order to convert them to an analog signal before processing them.

It goes without saying that the number of magnetic members, exciting lines and detecting lines is not restricted to the number illustrated in the embodiment. It has been experimentally confirmed that when the spacing of the detecting lines is about 2 to 6 mm, position detection is comparatively good. In addition, the position designating magnetic generator is not limited to a bar magnet, and may be in the form of a sheet, ring, or square, or may be an electromagnet.

Figure 13:
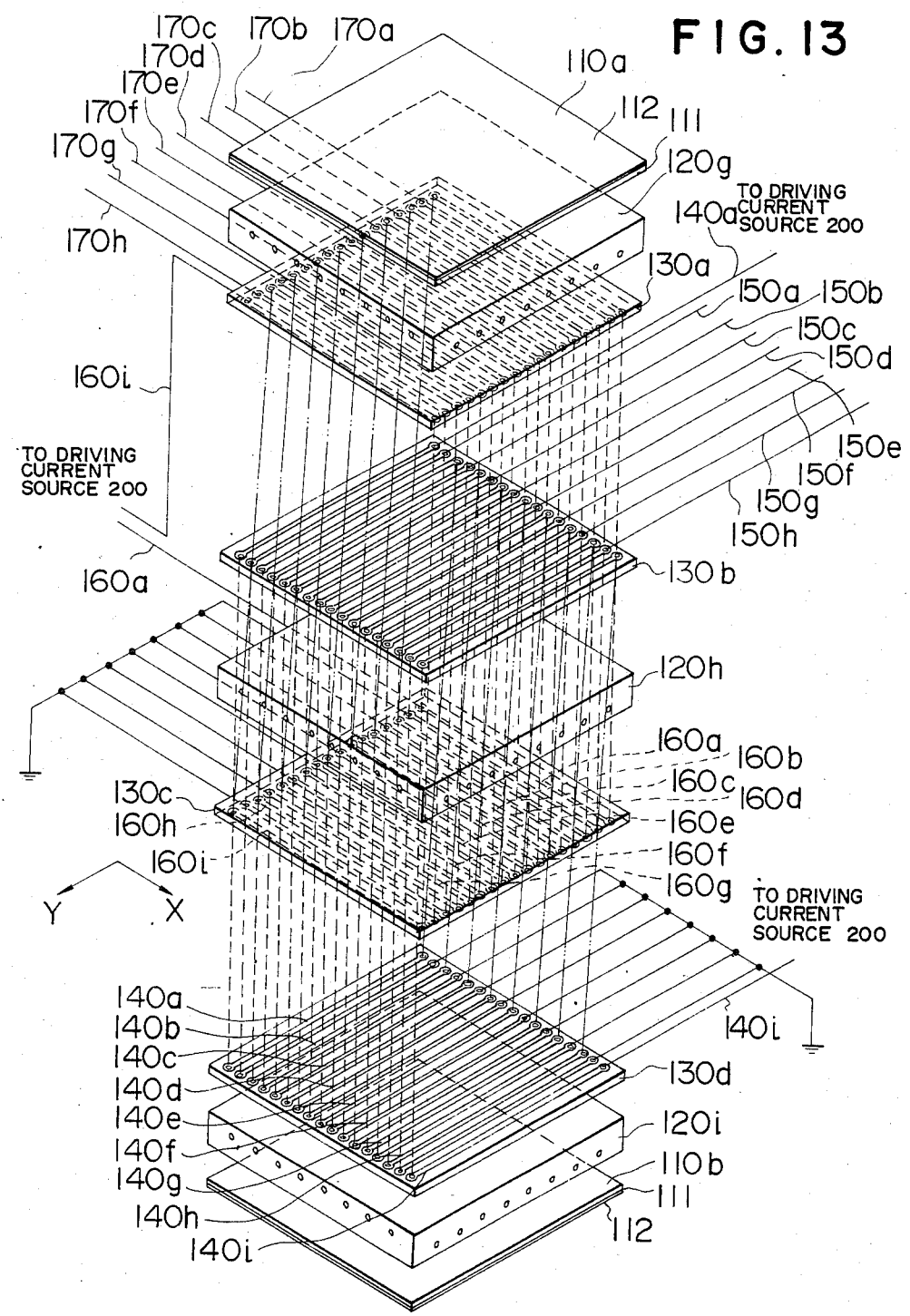
FIG. 13 shows a modification of the tablet portion.

FIG. 13 shows a modification of the tablet portion 100. The tablet portion 100 is, as is shown in FIG. 13, composed of nine layers which consist of a shield sheet 110a, a magnetic member composite 120g, conductive member composites 130a, 130b, a magnetic member composite 120h, conductive member composites 130c, 130d, a magnetic member composite 120i and a shield sheet 110b, the nine layers being laid sequentially on each other in reverse order with the shield sheet 110a on the top.

Figure 14:
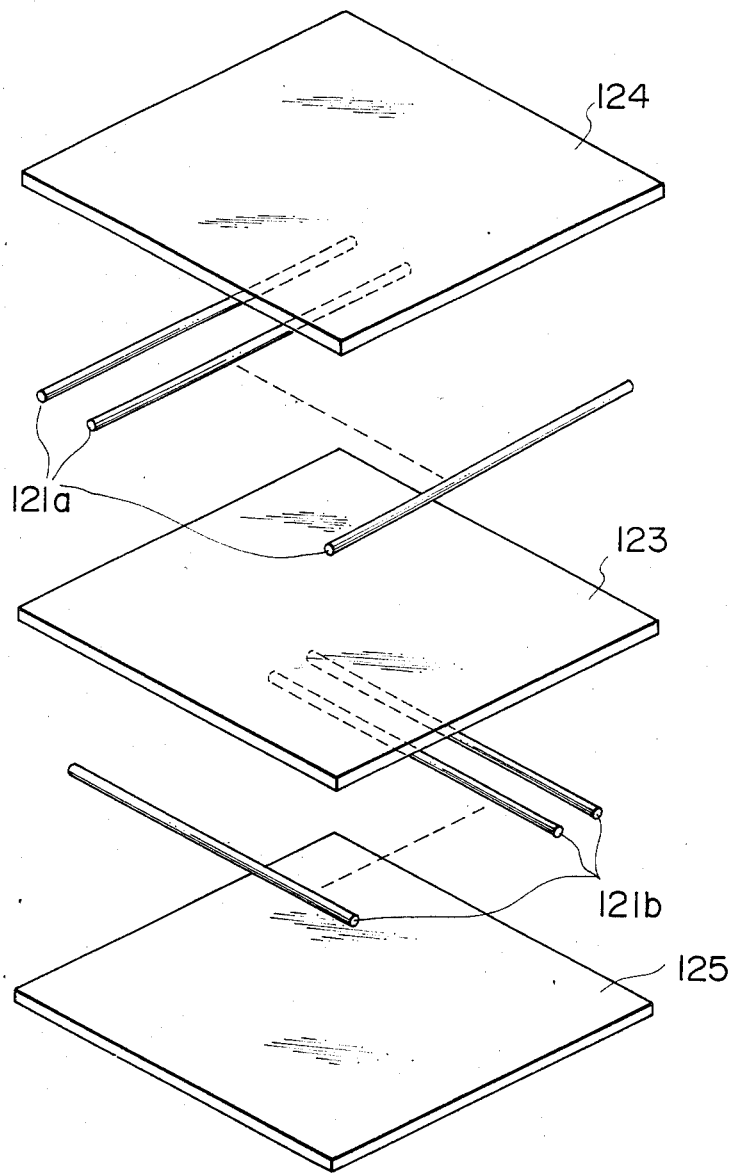
FIG. 14 shows the arrangement of a magnetic material composite in the modification shown in FIG. 13.

Each of the magnetic member composites 120g to 120i is formed of a plurality of (e.g., 20) long magnetic members 121a which are arranged substantially parallel to each other, and are sandwiched between insulating substrates 124, 125, of, e.g., a glass epoxy resin with or without an insulating substrate 123 such as an adhesive sheet or a glass epoxy resin interposed therebetween, and are bonded into one body by heat contact bonding or the like, as is shown in FIG. 14.

The substrates are bonded and fixed together by heat contact bonding through adhesive sheets. Each of the magnetic members 121a of the magnetic member composites 120g to 120i is disposed in the direction of the Y axis, and each of the magnetic members 121b is disposed in the direction of the X axis, while each of the conductive members of the conductive member composites 130a, 130c is disposed orthogonally to the Y axis, and each of the conductive members of the conductive member composites 130b, 130d is disposed orthogonally to the X axis.

Alternatively, the tablet portion may be manufactured by adhering and fixing the printed circuit base board onto both outer surfaces of the magnetic member composites, and thereafter with or without forming condr:ctive members by an etching process, forming a group consisting of the shield sheet 110a, the magnetic member composite 120g and the conductive member composite 130a, a group consisting of the conductive member composite 130b, the magnetic member composite 120h, and the conductive member composite 130c, and a group consisting of the conductive member composite 130d, the magnetic member composite 120i, and the shield sheet 110b, and further adhering and fixing these groups to each other.

Each conductive member of the conductive member composites 130b and 130d is connected such that each opposing pair is connected at the land holes at one end thereof by through-hole contact, thereby alternately constituting exciting lines 140a to 140i and detecting lines 150a to 150h in the direction of the X axis, which are wound around the magnetic members 121b in the magnetic member composite 120h. The other ends of the exciting lines 140a to 140i on the conductive member composite 130b are connected to the other ends of the adjacent exciting lines 140a to 140i of the conductive member composite 130d, namely, connected in series, and the other ends of the exciting lines 140a and 140i are connected to the driving current source 200. The other end of each of the detecting lines 150a to 150h on the conductive member composite 130b is connected to the multiplexer 301, while the other ends of the detecting lines 150a to 150h on the conductive member composite 130d are grounded in common with each other.

Each conductive member of the conductive member composites 130a and 130c is connected such that each opposing pair is connected at the land holes at one end thereof by through-hole contact, thereby alternately constituting exciting lines 160a to 160i and detecting lines 170a to 170h in the direction of the Y axis, which are wound around the magnetic members 121a in the magnetic member composite 120h. The other ends of the exciting lines 160a to 160i on the conductive member composite 130a are connected to the other ends of the adjacent exciting lines 160a to 160i of the conductive member composite 130c, namely, connected in series, and the other ends of the exciting lines 160a and 160i are connected to the driving current source 200. The other end of each of the detecting lines 170a to 170h on the conductive member composite 130a is connected to the multiplexer 302, while the other ends of the detecting lines 170a to 170h on the conductive member composite 130c are grounded in common with each other.

This tablet portion is the same as the example shown in FIG. 2 except for the above-described structure. According to this modification, it is possible to make the thickness of the tablet portion 100 smaller than the example described above.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A position detecting device comprising:
   a tablet portion including a magnetic member composite having a pair of insulating substrates with a plurality of long magnetic members sandwiched therebetween, said magnetic members being substantially parallel to each other; and two conductive member composites, each having a plurality of conductive members substantially parallel to each other, each of said two conductive member composites being placed on opposite side of said magnetic composite in such a manner that said conductive members are disposed orthogonally with respect to said magnetic members; and said conductive members on one of said two conductive member composites connected with the corresponding ones, on another of said conductive member composites, alternately constitute exciting lines and detecting lines;
   a driving current source for applying an alternating current of a predetermined frequency to each of said exciting lines;
   a position designating magnetic generator for generating a stationary magnetic field passing through the tablet portion; and
   a position detecting circuit for detecting, by calculation, the position which is indicated by said position designating magnetic generator.

2. A position detecting device according to claim 1, together with at least two other magnetic member composites placed outwardly against respective surfaces of said conductive member composites such as to be parallel to said magnetic member composite which is interposed between said conductive member composites.

3. A position detecting device according to claim 1 or 2, together with a shield sheet made of a non-magnetic metal placed outwardly on a corresponding outer side of each of said other magnetic member composites.

4. A position detecting device comprising:
   a tablet portion including two magnetic member composites each having a pair of insulating substrates with a plurality of long magnetic members substantially parallel to each other sandwiched between said substrates; and four conductive member composites each having a plurality of conductive members, said conductive members being arranged substantially parallel to each other, said two magnetic member composites being overlaid one over the other in such a manner that said magnetic members thereof are disposed in the directions of X and Y axes, respectively, wherein a pair of said conductive member composites are placed in overlying relation on a corresponding side of the overlaid magnetic material composites in such a manner that said conductive members on one conductive member composite of each pair are disposed along the X axis and those on the other conductive member composite of each pair are disposed along the Y axis, and said conductive members on said conductive member composites of each pair being respectively vertically connected to corresponding conductive members of the other pair, each set of interconnected conductive members alternately constituting exciting lines and detecting lines;
   a driving current source for applying an alternating current of a predetermined frequency to each of said exciting lines;
   a movable position designating magnetic generator for generating a stationary magnetic field; and
   a position detecting circuit connected to the detecting lines and responsive to changes in the magnetic field for detecting corresponding changes in magnetically induced voltages present in said detecting lines for determining coordinate positions of the movable generator.

5. A position detecting device according to claim 4, together with two other magnetic member composites which are overlaid one over the other in such a manner that said magnetic members are disposed in the directions of the X axis and the Y axis, respectively, and are placed each outwardly against respective surfaces of said conductive member composites.

6. A position detecting device according to either claim 4 or 5, together with a shield sheet made of a non-magnetic metal arranged outwardly against respective surfaces of said other magnetic member composites.

7. A position detecting device comprising:

a tablet portion including a magnetic member composite having two arrangements of a plurality of long magnetic members, said magnetic members being substantially parallel to each other; and two insulating substrates which sandwich said magnetic members therebetween, and four conductive member composites including a plurality of linear conductive members, said conductive members being arranged substantially parallel to each other, said magnetic member composite having said magnetic members disposed in the directions of the X axis and Y axis, respectively, each pair of said conductive member composites being placed on a corresponding side of said magnetic member composite in such a manner that said conductive members of one of said conductive member composites of each pair are disposed in the direction of the X axis while said conductive members of the other conductive member composite of each pair are disposed in the direction of the Y axis, and said conductive members of said conductive member composites of one pair are connected vertically with the corresponding conductive members of the conductive member composites of the other pair, each set of interconnected conductive members alternately constituting exciting lines and detecting lines;

a driving current source for applying an alternating current of a predetermined frequency to each of said exciting lines;

a movable position designating magnetic generator for generating a stationary magnetic field; and a position detecting circuit connected to the detecting lines and responsive to changes in the magnetic field for detecting corresponding changes in magnetically induced voltages present in said detecting lines for determining coordinate positions of the movable generator.

8. A position detecting circuit according to claim 7, together with two other magnetic member composites which are placed outwardly against respective surfaces of said conductive member composites in such a manner that said magnetic members are disposed in the directions of the X axis and Y axis, respectively.

9. A position detecting circuit according to claim 7 or 8, together with a shield sheet made of a non-magnetic metal arranged outwardly against respective surfaces of each of said other magnetic member composites.

* * * * *

UNITED STATES PATENT AND TRADEMARK OFFICE
CERTIFICATE OF CORRECTION

PATENT NO. : 4,678,870
DATED : July 7, 1987
INVENTOR(S) : Yoshinori Taguchi, et al.

It is certified that error appears in the above-identified patent and that said Letters Patent is hereby corrected as shown below:

Column 5, line 20, "130cnamely" should be --130c namely--.

Column 6, line 1, delete "that".

Column 6, line 10, "V1" should be changed to --$V_1$--.

Column 6, line 11, change "V8" to --$V_8$--.

Column 6, line 50, insert --}-- at the end of the formula.

Column 6, line 51, "}" should be deleted.

Column 6, line 58, change "formulae(6)" to --formula (6)--.

Signed and Sealed this

Twenty-fifth Day of April, 1989

Attest:

DONALD J. QUIGG

Attesting Officer      Commissioner of Patents and Trademarks